United States Patent
Carlson et al.

(10) Patent No.: US 6,845,240 B2
(45) Date of Patent: Jan. 18, 2005

(54) SYSTEM AND METHOD FOR ANALOG CELLULAR RADIO GEOLOCATION

(75) Inventors: John Peter Carlson, Herndon, VA (US); Thomas Booker Gravely, Herndon, VA (US); Joseph P. Kennedy, Jr., Great Falls, VA (US)

(73) Assignee: Grayson Wireless, Reston, VA (US)

( * ) Notice: Subject to any disclaimer, the term of this patent is extended or adjusted under 35 U.S.C. 154(b) by 574 days.

(21) Appl. No.: 10/011,783

(22) Filed: Dec. 11, 2001

(65) Prior Publication Data

US 2002/0128020 A1 Sep. 12, 2002

Related U.S. Application Data

(60) Provisional application No. 60/254,177, filed on Dec. 11, 2000.

(51) Int. Cl.[7] .................................................. H04Q 7/20
(52) U.S. Cl. ................................ 455/456.1; 455/456.2; 455/456.5; 455/404.2; 342/387
(58) Field of Search ........................... 455/456.1, 456.2, 455/456.3, 456.4, 456.6, 67.11, 560–562.1, 404.1, 404.2; 342/464, 457, 387, 465; 701/207

(56) References Cited

U.S. PATENT DOCUMENTS

| | | |
|---|---|---|
| 4,728,959 A | 3/1988 | Maloney et al. |
| 4,845,504 A | 7/1989 | Roberts et al. |
| 4,891,650 A | 1/1990 | Sheffer |
| 5,056,106 A | 10/1991 | Wang et al. |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,404,376 A | 4/1995 | Dent |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,592,180 A | 1/1997 | Yokev et al. |
| 5,675,344 A | 10/1997 | Tong et al. |
| 5,736,964 A | 4/1998 | Ghosh et al. |
| 5,914,687 A | 6/1999 | Rose |
| 5,945,948 A | 8/1999 | Buford et al. |
| 5,959,580 A | 9/1999 | Maloney et al. |
| 5,970,413 A | 10/1999 | Gilhousen |
| 6,047,192 A | 4/2000 | Maloney et al. |
| 6,097,336 A | 8/2000 | Stilp |
| 6,108,555 A | 8/2000 | Maloney et al. |
| 6,119,013 A | 9/2000 | Maloney et al. |
| 6,127,975 A | 10/2000 | Maloney |
| 6,184,829 B1 | 2/2001 | Stilp |
| 6,185,428 B1 * | 2/2001 | Kingdon et al. ......... 455/456.2 |
| 6,233,459 B1 * | 5/2001 | Sullivan et al. ......... 455/456.2 |
| 6,281,834 B1 | 8/2001 | Stilp |

(List continued on next page.)

Primary Examiner—David Hudspeth
Assistant Examiner—Kamran Afshar
(74) Attorney, Agent, or Firm—Duane Morris LLP

(57) ABSTRACT

A system and method for determining the geolocation of autonomous mobile appliances emitting analog waveforms is disclosed. More specifically, the inventive system and method is used to geolocate FM analog signals such as those used in the AMPS cellular radio air standard by using a time difference of arrival ("TDOA") approach. The inventive system and method uses a novel approach to minimize the amount of data sent between location sensors and the central location processor comprising adaptive signal combining from N channel to a single channel, FM demodulation to reduce bandwidth, Fourier transformation for signal compression, and segmentation of the location sensors into primary and secondary modes to allow for parallel processing to ease the computational burden on the central location processor.

13 Claims, 2 Drawing Sheets

U.S. PATENT DOCUMENTS

| | | |
|---|---|---|
| 6,288,675 B1 | 9/2001 | Maloney |
| 6,288,676 B1 | 9/2001 | Maloney |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,366,241 B2 | 4/2002 | Pack et al. |
| 6,400,320 B1 | 6/2002 | Stilp et al. |
| 6,421,009 B2 * | 7/2002 | Suprunov ............... 342/465 |
| 6,463,290 B1 | 10/2002 | Stilp et al. |
| 6,522,890 B2 * | 2/2003 | Drane et al. ............ 455/456.5 |
| 6,639,552 B2 * | 10/2003 | Carrott .................... 342/387 |
| 6,646,604 B2 | 11/2003 | Anderson |
| 2002/0094821 A1 * | 7/2002 | Kennedy, Jr. ............ 455/456 |
| 2002/0094824 A1 * | 7/2002 | Kennedy et al. ......... 455/456 |
| 2002/0137464 A1 * | 9/2002 | Dolgonos et al. ......... 455/60 |
| 2003/0129996 A1 * | 7/2003 | Maloney et al. ......... 455/456 |
| 2004/0043775 A1 * | 3/2004 | Kennedy et al. ........ 455/456.2 |

* cited by examiner

SYSTEM AND METHOD FOR ANALOG CELLULAR RADIO GEOLOCATION

RELATED APPLICATIONS

The present application is related to co-pending U.S. provisional patent application Ser. No. 60/254,177 entitled "A METHOD FOR ANALOG CELLULAR RADIO GEOLOCATION" filed Dec. 11, 2000, which is hereby incorporated herein by reference.

BACKGROUND OF THE INVENTION

A system and method for determining the geolocation of autonomous mobile appliances emitting analog waveforms is disclosed. More specifically, the inventive system and method is used to geolocate FM analog signals such as those used in the AMPS cellular radio air standard by using a time difference of arrival ("TDOA") approach.

There is currently much focus on technology for performing geolocation of cellular phones and other mobile appliances. This has been largely motivated by an FCC mandate requiring the location of wireless users to be provided to the Public Service Answering Point ("PSAP") when making an emergency 911 ("E911") call or other 911-related transmission. There are currently many systems and patents that deal with the source location of wireless radio frequency emitters. To a great extent, these patents simply suggest the idea of location of a transmitter source by some means, which is often impractical to implement for an application such as an E911 event. Very often, factors such as cost, complexity, and required computation horsepower are not fully considered.

Prior art systems usually deal with the source location of either analog or digital signals. The analog signals referred to herein are those signals which are not encoded for the purpose of transmitting digital information, but rather analog waveforms through means such as frequency modulation ("FM"). Digital signals, on the other hand, are those that employ some form of information bit to pulse shaped symbol encoding for the purpose of transmitting digital information, theoretically allowing loss-less transmission of data. The pulse-shaping and modulation schemes used in digital waveforms can be exploited to reduce the cost and resources required for a location system, in a manner that is not available in analog location systems. The present inventive system and method focuses on a location method used specifically for FM analog signals such as those used in the AMPS cellular radio air standard. It is to be understood that the present invention is not limited to a particular type of emitter of FM analog signals, such as AMPS or the AMPS air standard. Rather, the present invention is applicable to any system emitting FM analog signals. The motivation for the present invention has been driven by the requirements to design a geolocation system that reduces system cost and latency while simultaneously maximizing geolocation accuracy.

Radio location systems and methods can be grouped into two major classes. The first class of radio location systems and methods uses the arrival angle of a radio frequency ("RF") signal at an antenna array to determine a line of bearing from the array to the emitter of the RF signal. For example, a mobile radio transmits a signal which is received by multiple base stations in separate geographic locations. Each base station has an antenna array which measures the radio wave phase difference at different antenna elements in the array. An angle of arrival of the mobile radio's signal is calculated and a line of bearing to the mobile radio is determined. By obtaining multiple lines of bearing from multiple antenna arrays, the intersection of the lines of bearing provides the geolocation of the mobile radio.

The second class of radio location systems and methods uses the time differences of arrival from geographically separated sensors in order to estimate the emitter location through triangulation techniques. For example, a mobile radio transmits a signal which is received by multiple base stations in separate geographic locations. Each base station conducts time difference of arrival ("TDOA") measurements of the received signal and the TDOA measurements are used to determine the location the mobile radio using conventional positioning algorithms. A global positioning system ("GPS") or other time standard is typically used to provide a common time reference among the base stations and the mobile radio. Typically, a TDOA-based analog signal location system comprises multiple geographically separated sensors, referred to herein as Wireless Location Sensors ("WLS") that are connected and controlled through some communication means such as telephone lines of high speed data communication lines such as trunked DS0 or ISDN. All of the WLSs are controlled by a central processing facility, referred to herein as a Geolocation Control Server ("GCS") that tasks the sensors to simultaneously capture signals transmitted by a particular mobile radio, also referred to herein as a "mobile station". The captured signals are then sent to the GCS via telephone lines or high speed data communication lines, along with the precise time measurement of when the signals were captured. The location of the mobile station is then calculated through cross-correlations of the signals received at the GCS from the WLSs—the peaks of the captured signals reveal an estimate of the time differences of arrival of the mobile station's signals at the various WLSs. The time differences of arrival are geometrically interpreted as branches of hyperbolic surfaces that intersect at the location of the mobile station.

Each of the WLSs includes a precise time source, such as those derived from a GPS disciplined oscillator or other time standard, a radio frequency receiver, digitizing circuitry, a digital processor, and other standard circuitry such as an analog to digital ("A/D") converter, all of which operate to capture, store, and manipulate the received signals. However, in order to obtain an acceptable level of accuracy when performing a geolocation evolution, it is highly desirable to receive and process as much data as possible from the received signal. The more data that is used to determine the geolocation of the mobile station, the greater the accuracy of the geolocation estimate. One processing limitation that must be taken into account is the sampling rate. Due to the physical limitations of Nyquist sampled real signals, the sampling rate must be set to at least twice the rate of the highest frequency component of the received signal. Additionally, the level of quantization used at the analog to digital converter stage must be sufficient to capture a broad range of signal levels without significant distortion. All this data must be sent to the GCS, which requires that the data be sent over telephone lines of high speed data communication lines. Since the WLSs are located in geographically different locations, the data used for the geolocation calculation must be sent over telephone or high speed data communication lines from at least one WLS.

An example of the amount of data that must be sent from a WLS to the GCS, and the amount of time to send that data, consider a one second AMPS analog waveform received at a WLS and used to locate the mobile station to be geolocated. For the AMPS analog waveform, the baseband double-sided bandwidth is 30 KHz. Further consider that 16-bit A/D converters are used on each of two receive channels to provide approximately 96 dB of dynamic range and that the sampling rate is 40,000 complex samples/sec. Additionally, the data link between the WLS and the GCS is a DS0 high speed digital data communication line with a data transport rate of 64,000 bits per second ("bps"). Note that 40 KHz is a practical over-sampling rate which will allow sufficient excess bandwidth for filtering of adjacent signals and anti-aliasing, as is known in the art. In order to capture one full second of signal data for sufficient cross-correlating of the signals received at the GCS from the WLSs, the required amount of data in bits to be transmitted from a WLS to the GCS can be calculated as follows:

$$\left(40,000 \frac{\text{samples}}{\text{sec}}\right) \times (1 \text{ sec}) \times (2 \text{ channels}) \times \left(16 \frac{\text{bits}}{\text{sample}}\right) \times (2 \text{ samples}) = 2.56 \text{ Mbits}$$

The 2.56 Mbits of data is the total for two signals to be cross-correlated. Using a 64 kbps data rate for a DS0 high speed digital data communication line, the time to transfer the 2.56 Mbits of data can be calculated as follows:

$$(2.56 \text{ Mbits}) \div \left(64 \frac{\text{Kbits}}{\text{sec}}\right) = 40 \text{ sec}$$

As shown above, the time it takes to transfer a sufficient amount of data from an AMPS signal from a WLS to the GCS in order to accurately geolocate the mobile station is 40 seconds. This is clearly an unacceptable amount of time for applications where a high throughput of location estimates is required. Certain prior art systems attempt to overcome the data transfer problem by either limiting the amount of data sampled or by using excessively lossy data compression schemes. Thus, there is a need for a geolocation system and method for accurately geolocating a mobile station in a practical and efficient manner.

The present inventive system and method increases the speed of location estimates without sacrificing accuracy of the geolocation estimate. The inventive system and method does not use smaller sample sizes or excessively lossy data compression schemes. The inventive system comprises multiple WLSs that are typically co-located with the base stations of the mobile station's communication network, and a centrally-located GCS. The WLSs operate in one of two modes, a primary mode and a secondary mode, the operation of each will be described in detail below. Generally, once the system receives a request to locate a wireless user, or mobile station, each WLS operates in primary mode to initiate the geolocation evolution and send information regarding the signal received from the mobile station to the GCS. Upon receipt of the signals from the multiple WLSs, the GCS selects one WLS to be the primary WLS, the significance of which will be discussed later. The primary WLS continues to operate as before as well as operating in the secondary mode. The remaining WLSs switch to and operate in the secondary mode. The details of the operation of the system is disclosed below.

Accordingly, it is an object of the present invention to provide a novel system and method of geolocating a mobile station transmitting FM analog signals such as those used in the AMPS cellular radio air standard from a plurality of WLSs located in geographically spaced-apart locations.

It is another object of the present invention to provide a novel system and method for geolocating a mobile station transmitting an AMPS analog signal by reducing the amount of data to be transmitted across data communication lines.

It is yet another object of the present invention to provide a novel system and method for geolocating a mobile station transmitting and AMPS analog signal by combining multiple signals received at a WLS to a single channel, demodulating the single channel, and compressing the single channel by use of a Fourier transform circuit.

It is still another object of the present invention to provide a novel system and method for efficiently and accurately geolocating a mobile station by parallel processing the received signal data at the WLSs rather than at the GCS.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

A preferred embodiment of a novel system and method of geolocating a mobile station transmitting FM analog signals such as those used in the AMPS cellular radio air standard from a plurality of WLSs located in geographically spaced-apart locations is described.

Figure 1:
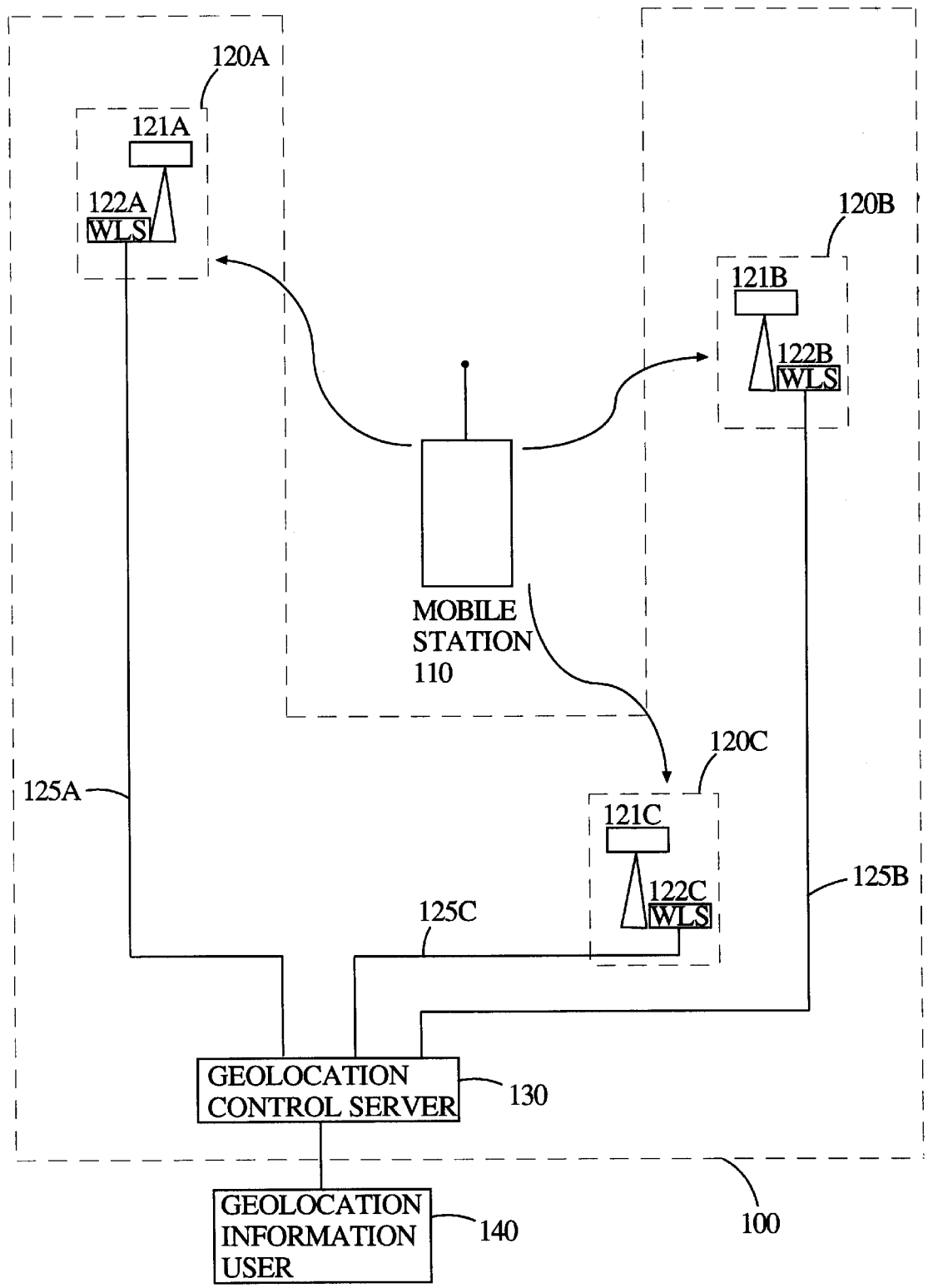
FIG. 1 is a notional schematic diagram of a geolocation system showing plural locating stations (WLS) connected via communication lines to a central processor.

FIG. 1 is a notional schematic diagram of a geolocation system according to an embodiment of the present invention. The geolocation system 100 comprises a number of WLSs, 122A, 122B, and 122C, typically located at the base stations 120A, 120B, and 120C, respectively, which include the antenna arrays 121A, 121B, and 121C, respectively. The antenna arrays may be either a single antenna or an array of antenna elements. While the present invention is not limited to co-locating the WLSs with the base stations, it is convenient to do so since the base stations and their antenna arrays are typically in-place and the WLSs can then simply be added to the existing structures. It is to be understood that while only thee WLSs are shown in FIG. 1, the invention is not limited to any specific number of WLSs. Obviously, at least three WLSs are desired in order to accurately geolocate the mobile station 110.

Each of the WLSs is connected to the Geolocation Control Server (GCS) 130 via communication lines 125A, 125B, and 125C, respectively. The communication lines may be telephone lines or, preferably, high speed data communication lines such as DS0 lines. The present invention is not limited to any particular type of communication line. The GCS 130 is connected to a geolocation information user 140 which may be, for example, a Public Service Answering Point ("PSAP") or any other system that would use the geolocation information produced by the GCS.

Operationally, the antennas 121A, 121B, and 121C receive FM analog signals, such as those used in the AMPS cellular radio air standard, from the mobile station 110. The received signals are sent to the respective WLSs 122A, 122B, and 122C, at each base station for processing. Once the signals are processed, the details of which will be described below, the signals are sent to the GCS 130 via the communication lines 125A, 125B, and 125C, respectively. The GCS processes the signals received from the WLSs and determines the geolocation of the mobile station 110. The GCS sends the geolocation information to one or more geolocation information users 140.

Figure 2:
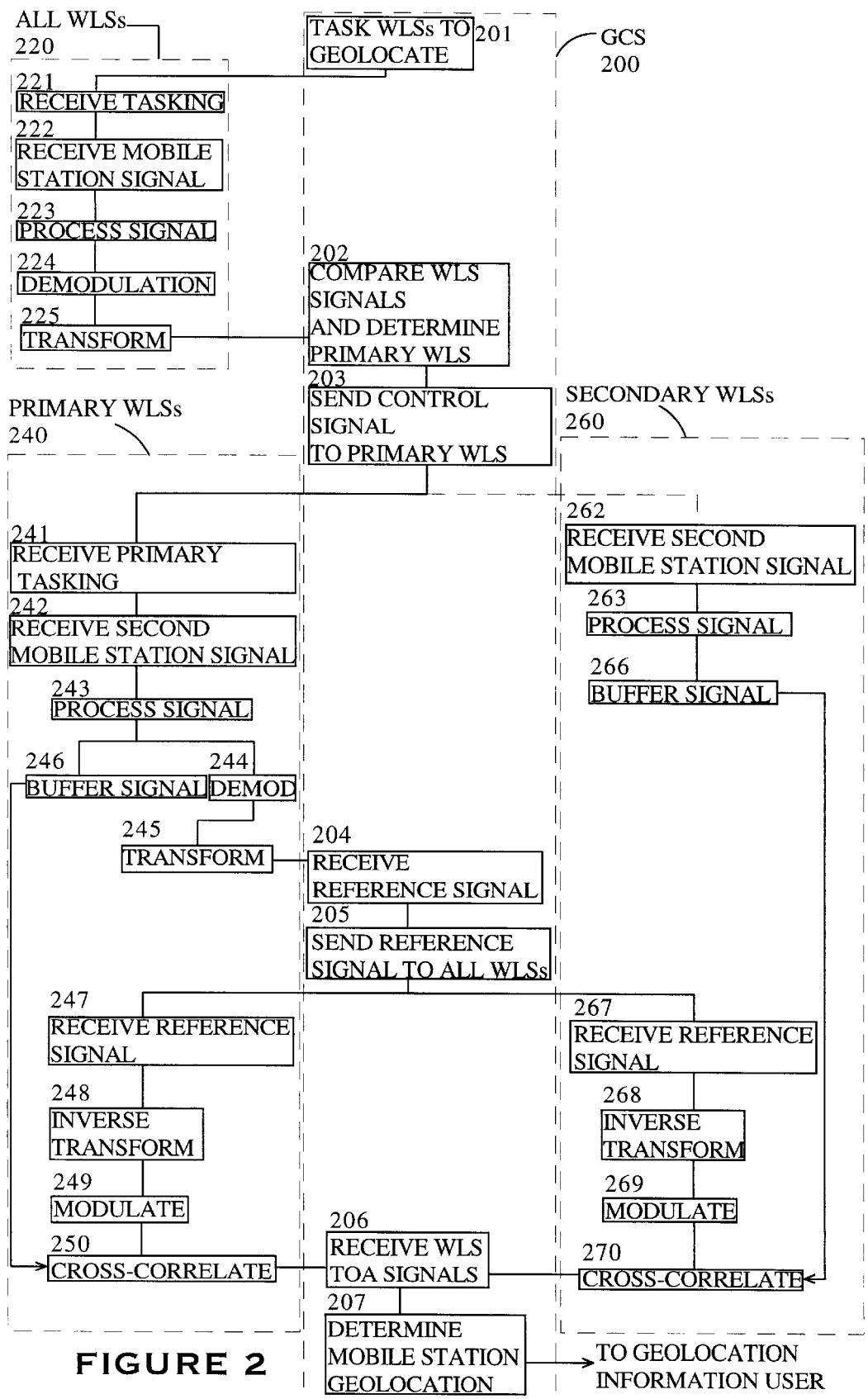
FIG. 2 is a functional block diagram outlining the steps taken to perform a geolocation evolution.

With reference now to FIG. 2, the detailed processing of signals at the WLSs and the GCS will be described. The block 200 represents the tasks that are performed at the GCS. The block 220 represents the tasks that are performed at all the WLSs for determining which WLS will be designated as the primary WLS. The block 240 represents those tasks performed by the primary WLS after it has been so designated. The block 260 represents those tasks performed by the secondary WLSs.

Upon receipt of an instruction to geolocate a mobile station, at block 201 the GCS tasks all the WLSs to begin the geolocation event in the primary mode. The instruction to geolocate a mobile station can be any typical instruction known to those of skill in the art such as receipt of a 911 call, receipt of another type of emergency call, a manual request, etc. The type and method of receipt of the instruction is not material to the present invention. All of the WLSs receive the initial primary mode tasking request at block 221. The primary mode processing encompasses the steps represented by blocks 222 through 225. At block 222, each of the WLSs that can receive the signal from the mobile station 110 substantially simultaneously capture the signals transmitted by the mobile station as received by the respective antenna array associated with the WLSs as shown in FIG. 1.

Each WLS that received the signal from the mobile station processes the captured signal at block 223 which includes digitizing the signals captured from each antenna on the respective antenna array, time stamping the captured signals, combining the captured signals to form one signal, and then location stamping the combined signal. If the mobile station's signal is only captured from one antenna or one antenna element, the step of combining captured signals is not performed. If the mobile station's signal is captured from more than one antenna element at a base station, the WLS associated with that base station combines the captured signals for two reasons. First, to reduce signal facing incurred from multipath and interference, the presence of either tends to decrease the accuracy of the geolocation estimate. Second, to reduce the amount of data to be transferred across the communication lines between the WLSs and the GCS. The algorithms used to achieve the combination of signals are algorithms that are well known in the art such as Equal Gain Combining ("EGC"), Maximal Ratio Combining ("MRC"), Projection Approximation Subspace Tracking ("PAST"), Constant Modulus Algorithm ("CMA"), etc. Any of these algorithms are applicable for reducing the effects of fading and/or interference typically encountered in wireless communication channels.

After the captured signals are combined and location stamped, the resultant signal, referred to herein as the "combined signal", is demodulated at block 224. If the mobile station is transmitting FM analog signals, then the demodulation is an FM demodulation. The resultant demodulated signal is then transformed at block 225 to compress the data without loss of geolocation accuracy and the transformed signal is sent to the GCS for comparison with the transformed signals from all the WLSs which received the signal from the mobile station. The details associated with the transformation of the demodulated signal at block 225 are revealed next.

In the case of an AMPS analog signal transmitted from the mobile station, the demodulated signal bandwidth ranges from approximately 300 Hz to 3500 Hz. Additionally, there is a small amount of bandwidth occupied by the Supervisory Audio Tone ("SAT") associated with the AMPS air standard. The SAT is located at one of three possible frequencies: 5970 Hz, 6000 Hz, or 6030 Hz. In order to exploit a reduction in bandwidth for the purpose of reducing the storage requirements and the data transfer requirements, a transformation circuit, preferably a Fast Fourier Transform ("FFT") circuit, is used at block 225 to transform the demodulated signal from the time domain to the frequency domain. The transformed signal, in the frequency domain, now spans a number of frequency bins. Assuming that the number of frequency bins is 1024 the transformed signal resides in 1024 frequency bins. It is to be understood that the present invention can operate with any number of frequency bins and is not limited to 1024 frequency bins.

With 1024 frequency bins and a practical over-sampling rate of 40,000 complex samples/sec (from the example above), each of the 1024 frequency bins has a span of:

$$\left(40,000 \frac{\text{samples}}{\text{sec}}\right) \div (1024 \text{ bins}) = 39.0625 \text{ Hz}$$

Of all the 1024 bins that contain information, only those bins that contain information in the 30–3500 Hz range for the demodulated signal as well as the bin for the SAT frequency are of interest for geolocation purposes. All the other bins represent noise and are of no use for geolocation. Consequently, 83 of the 1024 bins of information are kept and the rest are discarded. Of the 83 bins, 82 of the bins are for the demodulated signal (3200 Hz range divide by 39.0625 Hz/bin) and one bin is for the SAT.

An important point to note is that the output of the demodulator is a real signal which makes the spectrum exhibit conjugate symmetry. Therefore, we can preserve only half of the output of the FFT with no loss in signal representation.

We can now calculate the amount of transformed data to be transferred from a WLS to the GCS as follows:

$$(40 \text{ Hz}) \times (1 \text{ sec}) \times \left(16 \frac{\text{bits}}{\text{bin}}\right) \times (2 \text{ samples}) \times (83 \text{ bins}) = 106,240 \text{ bits}$$

Note that we used 40 Hz blocks of data rather than 39.0625 Hz so as not to lose any information. When compared to the amount of data to be transferred from the previous example (the raw samples taken from the A/D converter), the amount of data to be transmitted using the inventive method is only 4.15% of the data in the previous example:

$$106,240 \text{ bits} \div 2,560,000 \text{ bits} \times 100 = 4.15\%$$

The time to transfer the 106,240 bits of data, herein referred to as WLS reference data, over a DS0 high speed digital data communication line operating at 64 kbps (as in the previous example) can be calculated as follows:

$$106,240 \text{ bits} \div 64 \frac{\text{Kbits}}{\text{sec}} = 1.66 \text{ sec}$$

The 1.66 seconds required to transfer the WLS reference data is a vast improvement over the 40 seconds required to transfer the raw samples out of the A/D converter in the previous example.

After transforming the data as explained above, each WLS transfers the WLS reference data to the GCS. The GCS, at block 202, receives the WLS reference data from each of the WLSs that received a signal from the mobile station being geolocated and compares the signals to determine which WLS received the strongest signal from the mobile station. The GCS can determine which station received the strongest signal due to the location stamp added by each WLS. The WLS then sends a control signal at block 203 to the WLS with the strongest mobile station signal and designates that WLS the primary WLS, the effect of which is described below. The determination of which WLS received the strongest mobile station signal is performed by methods well known in the art and the specific method used is immaterial to the present invention.

It is important to note that some of the WLSs may receive the mobile station signal without sufficient quality to demodulate the signal. Typically, poor signal quality results from propagation loss, blockage or fading. As is known in the art, approximately a 12 dB signal to noise ratio is required for proper demodulation. To overcome this problem, the present inventive system and method incorporates the concept of primary and secondary WLSs as will be described next.

Once the GCS determines the WLS with the highest signal quality, that WLS is designated as the primary WLS. The GCS commands the primary WLS to continue processing blocks of captured mobile station signals as before and to buffer a copy of the captured signal prior to demodulation. Substantially simultaneously, the WLSs not designated as primary, referred to herein as secondary WLSs, continue to capture and process signals from the mobile station and buffer the processed signals prior to demodulation and transformation. When the primary WLS sends its WLS reference data, herein designated the primary reference data, to the GCS, the GCS routes the primary reference data to all the WLSs participating in the geolocation event including the primary WLS. Each WLS then inverse transforms and modulates the primary reference data to restore it to a replica of the mobile station signal as seen by the primary WLS. This replica signal is used by each WLS to cross-correlate with the processed signal received at that WLS to extract the time of arrival for the mobile station signal at that WLS. The cross-correlation helps improve the quality of the mobile station signal as received at the secondary WLS performing the cross-correlation. After processing all the blocks of data in the primary reference data, each WLS participating in the geolocation event, including the primary WLS, sends a signal representative of the time of arrival of each block of data back to the GCS. The GCS receives the times of arrival from the WLSs and determines the geolocation of the mobile station.

With renewed reference to FIG. 2, the above procedure will be explained with respect to FIG. 2. When the GCS determines the primary WLS in block 202, the GCS sends a control signal to the to-be-designated primary WLS at block 203. The to-be-designated WLS receives the control signal from the GCS at block 241 and commences to operate as the primary WLS. Initially, the primary WLS processes captured mobile station signals as before in blocks 222 through 225, which correspond to blocks 242 through 245. Additionally, the primary WLS buffers, at block 246, a copy of the processed captured mobile station signal prior to demodulation of that signal. The buffered signal will be used later as discussed further below. While the primary WLS is capturing and processing mobile station signals, the other WLSs participating in the geolocation event, now referred to herein as secondary WLSs, substantially simultaneously receive the mobile station signals at block 262 and capture and process at block 263 those signals. At block 266, the captured, processed signals are buffered in a similar manner as the primary WLS at block 246. Note that in FIG. 2 a dashed line connects the block 203 in the GCS to the block 262 in the secondary WLSs. The secondary WLSs do not receive a signal from the GCS designating the WLSs as secondary WLSs. The lack of receipt of a signal designating the WLS as the primary WLS initiates the WLSs to operate in secondary WLS mode.

Once the primary WLS transforms the mobile station signal at block 245, the primary WLS sends the primary reference data to the GCS. The GCS receives the primary reference data at block 204 and routes the primary reference data to all the WLSs, including the primary WLS, at block 205. The primary and secondary WLSs receive the primary reference data from the GCS at block 247 and block 267, respectively. The primary and secondary WLSs perform and inverse transformation, preferably an inverse FFT at block 248 and block 268, respectively. The primary and secondary WLSs then modulate the inverse transformed signal at block 249 and block 269, respectively. The output of the modulators is a replica of the mobile station signal as received by the primary WLS, which was initially designated the primary WLS based on a determination at the GCS as being the WLS with the highest quality of the received mobile signal. The replica signal is then used at each WLS to cross-correlate at block 250 and block 270, for the primary and secondary WLS respectively, with the signal received at that WLS to improve the quality of the mobile station signal received at the WLS. The cross-correlation method used is any standard cross-correlation algorithm known in the art. The output of the cross-correlation blocks 250 and 270 are signals representative of the times of arrival of each of the blocks of data in the primary reference signal. The times of arrival signals are then sent to the GCS, which receives the times of arrival signals at block 206. The GCS then determines, at block 207, the geolocation of the mobile station by standard time of arrival techniques well known in the art. The GCS may then send a signal to one or more geolocation information users as shown in FIG. 1.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method for geolocating a mobile appliance transmitting an FM analog signal which can be received by a plurality of wireless location sensors each including at least one antenna, comprising the steps of:
   (a) sending a first geolocation reference signal from each of a plurality of wireless location sensors to a central node, comprising the steps of:
      (i) receiving a first FM analog signal on one or more of the at least one antennas;
      (ii) digitizing the received signals;
      (iii) time-stamping the digitized signals;
      (iv) combining the time-stamped signals if received on more than one antenna;
      (v) providing a location identification stamp for the combined signal to thereby produce a first location-identified signal;
      (vi) frequency demodulating the first location-identified signal;

(vii) transforming the demodulated signal from the time domain to the frequency domain;

(viii) providing the first geolocation reference signal including a select portion of the frequency domain signal; and (ix) sending the first geolocation reference signal to a central node;

(b) determining at the central node a primary wireless location sensor including the steps of:

(i) receiving the first geolocation reference signals from each of the plurality of wireless location sensors;

(ii) providing a predetermined quality factor;

(iii) comparing each of the first geolocation reference signals with the predetermined quality factor to thereby determine a primary geolocation reference signal;

(iii) identifying a primary wireless location sensor from the location identification stamp for the primary geolocation reference signal; and (iv) sending a control signal to the primary wireless location sensor;

(c) receiving a second FM analog signal at each of the plurality of wireless location sensors, comprising the steps of:

(i) repeating steps (a)(i) through (a)(v) for said second FM analog signal to thereby produce a second location-identified signal; and (ii) buffering the second location-identified signal to thereby produce a buffered signal;

(d) sending a reference signal from the primary wireless location sensor to the central node, comprising the steps of:

(i) repeating steps (a)(vi) and (a)(vii) for the second location-identified signal in response to receipt of the control signal from the central node;

(ii) providing the reference signal including a select portion of the frequency domain signal from step (d)(i); and (iii) sending the reference signal to the central node;

(e) sending the reference signal from the central node to each one of the plurality of wireless location sensors in response to receipt at the central node of the reference signal from the primary wireless location sensor;

(f) sending a geolocation time of arrival signal from each of the plurality of wireless location sensors to a central node, comprising the steps of:

(i) receiving the reference signal from the central node;

(ii) transforming the reference signal from the frequency domain to the time domain to thereby create a time domain reference signal;

(iii) providing a carrier signal representative of the FM analog signal carrier wave;

(iv) modulating the carrier signal with the time domain reference signal;

(v) comparing the buffered signal with the time domain reference signal to thereby determine the time of arrival of the second FM analog signal at the wireless location sensor; and (vi) sending the geolocation time of arrival signal which is representative of the time of arrival of the second FM analog signal to the central node;

(g) receiving the geolocation time of arrival signals from the plurality of wireless location sensors;

(h) determining the geolocation of the mobile appliance at the central node from the geolocation time of arrival signals.

2. A method for geolocating a mobile appliance transmitting an FM analog signal which can be received by a plurality of wireless location sensors, comprising the steps of:

(a) receiving a first FM analog signal at each of the plurality of wireless location sensors;

(b) sending a first geolocation reference signal from each of the plurality of wireless location sensors to a central node wherein said first geolocation reference signal is a digitized, time and location stamped frequency domain signal including a select portion of the first FM analog signal;

(c) determining at the central node a primary geolocation reference signal by comparing each of the first geolocation reference signals with a predetermined quality factor to thereby determine a primary geolocation reference signal and designating the wireless location sensor that sent the primary geolocation reference signal as the primary wireless location sensor;

(d) sending a control signal to the primary wireless location sensor;

(e) receiving a second FM analog signal at each of the plurality of wireless location sensors and buffering the digitized, time and location stamped second FM analog signal to thereby create a buffered signal;

(f) sending a first reference signal from the primary wireless location sensor to the central node wherein said reference signal comprises a digitized, time and location stamped frequency domain signal including a select portion of the second FM analog signal;

(g) sending the first reference signal from the central node to each one of the plurality of wireless location sensors in response to receipt at the central node of the first reference signal from the primary wireless location sensor;

(h) receiving the first reference signal from the central node at each of the plurality of wireless location sensors;

(i) providing at each of the plurality of wireless location sensors a second reference signal comprising a time domain FM modulated version of the first reference signal;

(j) comparing at each of the plurality of wireless location sensors the buffered signal to the second reference signal to thereby determine the time of arrival of the second FM analog signal at each of the plurality of wireless location sensors;

(k) sending a geolocation time of arrival signal from each of the plurality of wireless location sensors to a central node wherein the geolocation time of arrival signal is representative of the time of arrival of the second FM analog signal;

(l) receiving at the central node the geolocation time of arrival signals from the plurality of wireless location sensors;

(m) determining the geolocation of the mobile appliance at the central node from the geolocation time of arrival signals.

3. A method of geolocating a mobile appliance transmitting an FM analog signal comprising the steps of:

(a) receiving at a plurality of wireless location sensors a first FM analog signal from the mobile appliance and sending in response thereto a first reference signal representative of the first FM analog signal to a central node;

(b) comparing at the central node the first reference signals from the plurality of wireless location sensors to thereby determine a primary wireless location sensor and sending a control signal to the primary wireless location sensor;

(c) receiving at each of the plurality of wireless location sensors a second FM analog signal from the mobile appliance and producing in response thereto a buffered signal representative of the second FM analog signal;

(d) sending from the primary wireless location sensor via the central node to each of the plurality of wireless location sensors a second reference signal representative of the second FM analog signal as received at the primary wireless location sensor;

(e) comparing at each of the plurality of wireless location sensors the buffered signal to the second reference signal to thereby produce a geolocation reference signal;

(f) sending from each of the plurality of wireless location sensors to the central node the geolocation reference signal;

(g) receiving at the central node the geolocation reference signals from each of the plurality of wireless location sensors and calculating the geolocation of the mobile appliance therefrom.

4. In a system for geolocating a mobile appliance transmitting an FM analog signal that can be received by a plurality of geographically spaced-apart wireless location sensors each including at least one antenna for receiving the FM analog signal, where geolocation information is sent between the wireless location sensors and a central signal processing node, the improvement of using at at least one of the wireless location sensors an adaptive signal combining circuit for combining the FM analog signals received on the at least one antenna to thereby reduce the amount of information to be sent between the wireless location sensors and the central processing node.

5. The system of claim 4 including an FM demodulation circuit to provide bandwidth reduction so as to further reduce the amount of geolocation information to be sent between the wireless location sensors and the central signal processing node.

6. The system of claim 4 including a Fourier Transform circuit to provide signal compression so as to further reduce the amount of geolocation information to be sent between the wireless location sensors and the central signal processing node.

7. The system of claim 6 wherein the Fourier Transform circuit is a Fast Fourier Transform circuit.

8. In a system for geolocating a mobile appliance transmitting an FM analog signal that can be received by a plurality of geographically spaced-apart wireless location sensors each including at least one antenna for receiving the FM analog signal, wherein geolocation information is sent between the wireless location sensors and a central signal processing node, the improvement of using, at at least one of the wireless location sensors, an adaptive signal combining stage for reducing the number of channels of information to be processed, an FM demodulation stage to provide bandwidth reduction, and a Fourier Transform stage to provide signal compression so as to reduce the amount of geolocation information to be sent between the wireless location sensors and the central signal processing node.

9. In a method for geolocating a mobile appliance transmitting an FM analog signal that can be received by a plurality of geographically spaced-apart wireless location sensors each including at least one antenna for receiving the FM analog signal, where data representative of the received FM analog signal is sent between the wireless location sensors and a central signal processing node, the improvement of digitizing and compressing the received FM analog signals at the wireless location sensors so as to minimize the amount of data to be sent between the wireless location sensors and the central signal processing node.

10. The method of claim 9 wherein the amount of data representative of the received FM analog signal to be sent from a wireless location sensor to the central signal processing node is less than 5% of the amount of data representative of the received FM analog signal at the wireless location sensors.

11. The method of claim 9 wherein the amount of data representative of the received FM analog signal to be sent from a wireless location sensor to the central signal processing node is less than 10% of the amount of data representative of the received FM analog signal at the wireless location sensors.

12. A geolocation system for geolocating a mobile appliance transmitting an FM analog signal which can be received by a plurality of wireless location sensors comprising:

a plurality of wireless location sensors each including at least one antenna comprising:
(a) a receiver for receiving FM analog signals from ones of the at least one antennas;
(b) a first interface circuit for sending signals to a central node and for receiving signals from the central node;
(c) a first signal processing circuit comprising:
(i) a digitizer for digitizing the received FM analog signals;
(ii) time-stamping means for time-stamping the digitized signals;
(iii) a combiner for combining the time-stamped signals; and
(iv) location identification stamping means for providing a location identification stamp for the combined signal to thereby create a location-identified signal;
(d) a second signal processing circuit for producing a reference signal comprising:
(i) a demodulator for frequency demodulating the location-identified signal;
(ii) first transforming means for transforming the demodulated signal from the time domain to the frequency domain; and
(iii) selecting means for selecting a portion of the frequency domain signal to thereby produce the reference signal;
(e) a third signal processing circuit for producing a geolocation reference signal comprising:
(i) a buffer for buffering the location-identified signal to thereby produce a buffered signal;
(ii) second transforming means for transforming a reference signal sent by the central node from the frequency domain to the time domain to thereby produce a time domain reference signal;
(iii) first circuit means for providing a carrier signal representative of the FM analog signal carrier wave;
(iv) a modulator for modulating the carrier signal with the time domain reference signal;
(v) a first comparator for comparing the buffered signal with the time domain reference signal to thereby determine the time of arrival of an FM analog signal at said at least one antennas; and (vi) second circuit means for producing the geolocation reference signal representative of said time of arrival of an FM analog signal;

a central node comprising:

(a) a second interface circuit for sending signals to the plurality of wireless location sensors and for receiving signals from the wireless location sensors;

(b) second circuit means for providing a predetermined quality factor;

(c) a second comparator for comparing the reference signals from each of the plurality of wireless location sensors with the predetermined quality factor to thereby determine a primary geolocation reference signal;

(d) third circuit means for identifying a primary wireless location sensor from the location identification stamp for the primary geolocation reference signal;

(e) fourth circuit means for producing a control signal to be sent to the primary wireless location sensor; and (f) a fourth signal processing circuit for determining the geolocation of the mobile appliance at the central node from the geolocation reference signals.

13. The system of claim 12 whereby:

each of the plurality of wireless location sensors receives a first FM analog signal from the mobile appliance and sends a first reference signal representative of the first FM analog signal to the central node in response thereto, the central node compares the first reference signals from the plurality of wireless location sensors to thereby determine the primary wireless location sensor and sends the control signal to the primary wireless location sensor, each of the plurality of wireless location sensors receives a second FM analog signal from the mobile appliance and produces a buffered signal representative of the received second FM analog signal in response thereto, the primary wireless location sensor sends a second reference signal representative of the second FM analog signal received at the primary wireless location sensor to each of the plurality of wireless location sensors via the central node, each of the plurality of wireless location sensors compares the buffered signal to the second reference signal to thereby produce a geolocation reference signal and sends the geolocation reference signal to the central node, the central node receives the geolocation reference signals from each of the plurality of wireless location sensors and determines the geolocation of the mobile appliance therefrom.

* * * * *